(12) United States Patent
Ogawa et al.

(10) Patent No.: US 6,338,468 B1
(45) Date of Patent: Jan. 15, 2002

(54) BUTTERFLY VALVE WITH LOW NOISE

(75) Inventors: Kazuhiko Ogawa, Kobe; Kouichi Hisada, Osaka, both of (JP)

(73) Assignee: Tomoe Technical Research Company, Osaka (JP)

(*) Notice: Subject to any disclaimer, the term of this patent is extended or adjusted under 35 U.S.C. 154(b) by 0 days.

(21) Appl. No.: 09/737,467

(22) Filed: Dec. 18, 2000

(51) Int. Cl.$^7$ ................................................ F16K 1/22
(52) U.S. Cl. ...................................................... 251/305
(58) Field of Search ................................ 251/305, 306, 251/307, 308

(56) References Cited

U.S. PATENT DOCUMENTS

| | | | | |
|---|---|---|---|---|
| 1,706,020 A | * | 3/1929 | Barfoed | 251/305 X |
| 3,238,955 A | * | 3/1966 | Lassiter, Jr. | 251/305 X |
| 4,840,114 A | * | 6/1989 | Bauer et al. | 251/306 X |
| 5,957,428 A | * | 9/1999 | Yokota | 251/305 |

* cited by examiner

Primary Examiner—Kevin Shaver
Assistant Examiner—John Bastianelli
(74) Attorney, Agent, or Firm—Larson & Taylor PLC

(57) ABSTRACT

A simplified butterfly valve with low noise in which a cavitation to be generated in a narrowed flow region that is delimited by a valve disc in a valve casing is reduced thereby to control the noise, and the valve can be applied even to a flow line for a fluid containing slurry or foreign particles, and can be used for a fluid flow line through a fluid is flows at a high flow rate. In the butterfly valve with low noise, an enlarged section 35 having the enlarged sectional shape symmetrical relative to the center axis is provided in a downstream side immediately behind a valve seat so as to control or suppress the noise and cavitation which occur around the valve disc, an inner diameter Dy of the enlarged section 35 is made more than 1.3 times a inner diameter D of the piping to which the valve is mounted, and the length X1 of the enlarged section 35 is made more than 0.5 times the inner diameter D of the piping.

4 Claims, 10 Drawing Sheets

ABSTRACT# BUTTERFLY VALVE WITH LOW NOISE

TECHNICAL FIELD

The present invention relates to a butterfly valve that is a kind of industrial valves used for the control of flow rate and pressure of liquid. In particular, the invention relates to a butterfly valve that can reduce the cavitation noise likely to occur in a small valve opening.

BACKGROUND ART

In a conventional butterfly valve, as shown in FIG. 1, a flow rate of the valve increases in a narrowed portion or a narrow area at an orifice side and a pressure around the valve lowers. The lowering of the pressure quickly increases the volume of each of fine air bubbles (bubble nuclei) contained in the liquid thereby generating cavitation bubbles. After liquid passes through the narrow area within the valve, the velocity of the flow decreases and recovers. Therefore, cavitation bubbles collapse in the downstream of the valve.

When the cavtation air bubbles grow from the air bubble nuclei around the valve, the peripheral pressure varies according to the contraction movement of the air bubbles, and this movement causes a tremendous noise. Further, the collapse of cavitation bubbles causes an impact pressure and the so-called cavitation phenomenon occurs that gives damages to the valve or piping arrangements by noise or vibrations.

Furthermore, the butterfly valve used for control aims originally at adjusting the flow rate or pressure by throttling the valve opening, and to achieve the object there is current no alternative but to use the butterfly valve while keeping patience on a cavitation accompanied by noise.

In light of the above present status there have been so far proposed butterfly valves for controlling a noise and cavitation to be produced from valve bodies.

FIGS. 2A and 2B show one example (see Japanese Patent Unexamined Publication No. 57-157866) of such a butterfly valve. The reference numeral 1 designates a valve disc which is disposed within a valve casing 2 and is pivotally supported by a valve rod 3 orthogonally crossing at the centre axis of the valve casing 2. The valve disc 1 is shown in the fully closed state in the drawing. The valve disc 1 is provided with a valve disc 1a in an angled form, being vertical to the valve rod 3. The peripheral surface of the valve disc 1a is cooperated with the inner surface 2a of the valve casing 2 to form a sealing surface which is shown with dotted line 1b in the drawing. The centre axis 1c of the sealing surface 1b passes through bores 4 provided on the valve disc 1 for receiving the valve rod 3. The centre axis 1c is inclined making an angle of about 15° to 20° relative to an axis 2b vertical to the inner surface 2a of the valve casing 2.

The valve disc 1a is intended to be in close contact with the inner surface or bore 2a of the valve casing 2 of the butterfly valve and is in such configuration that two semicircular wall portions make an angled form as described above. Over one semi-circumference of the valve disc 1a are provided comb-teeth shape projections 5 at the flow-in side so that they are integrally projected in the flow-in direction (shown with thick arrow mark F1) at use. The other semicircumference are provided with comb-teeth-shape projections 6 at the flow-out side which are integrally projected in the flow-out direction of the fluid i.e. in the reverse direction to the comb-teeth-shape projections 5 at the flow-in side. Both the comb-teeth-shape projections 5 and 6 are formed so as to be approximately in parallel with the inner surface 2a of the valve casing 2, and have tip ends formed so as to be positioned with the surface vertical to the inner surface 2a of the valve casing 2. Further, each of the comb-teeth-shaped projections 5 and 6 is formed to become gradually shorter towards bosses 7 each of which is positioned at the centre axis and into which the bores 4 are formed.

In the operation of the illustrated valve, if the valve disc 1 is rotated clockwise as shown with an arrow F2 from the fully closed state shown in FIG. 2A, the flow rate varies with the valve opening. At that time, the fluid passes through a nozzle side area and an orifice side area. The orifice side area is an opening portion delimited by the inner surface 2a of the valve casing 2 and the peripheral portion of the valve disc 1 positioned in the downstream side of the valve rod 3. The nozzle side area is an opening portion delimited likewise by the inner surface 2a of the valve casing 2 and the peripheral portion of the valve disc 1 positioned in the upstream of valve rod 3. The fluid flow passing through the nozzle side area and the orifice side area changes to fine jet streams by trapezoidal (in section) passages 8, as shown in FIG. 2B, formed between the plural respective comb-teeth-shaped projections 5 and 6. Consequently, the cavitation generated in the downstream side of the valve body 1 is dispersed to suppress the growth of the cavitation. In FIG. 2B the reference numeral 9 denotes inlets.

FIGS. 3A and 3B show another example of a conventional butterfly valve with a cavitation control function (see Japanese Patent No. 2536329). In a valve casing 11 a valve disc 12 is rotatably supported by valve rods 13 which are mounted on its two sides. When the valve disc 12 rotates from its closed state towards its opening, one semicircumferential portion 12A of the valve body 12 moves towards the upstream side while the other semicircumferential portion 12B moves towards the downstream side. In the surface near the outer periphery in the downstream side of the semi-circumferential portion 12A there are continuously projected approximately equally thicked ribs 14 over the whole semi-circle connecting the two supports 15 of a valve rod 13. Then, the respective ribs 14 are provided with a plurality of through bores 16 which inverse-radially converge being directed towards the surface centre axis 12C of the valve disc 12.

FIGS. 4A and 4B show still another example of a conventional eccentric butterfly valve (see Japanese Patent Publication No. 52-33330). The butterfly valve comprises a valve casing including a casing body 21 and a casing flange 22. A valve disc 23 is supported by a valve rod or biassed trunnion 24 attached to the casing body 21 in a position offset from the disc 23. The valve seat portion of the eccentric butterfly valve is provided with a resilient seating ring 25 in such a manner that the ring may be embedded in an inner wall recess 26 of the casing body 21.

The casing body 21 is provided with recesses 21a and 21b in the downstream side of the valve seat. As illustrated in FIG. 4B, the recesses 21a and 21b are formed to have a maximum depth in the intermediate position between bearing portions at both the sides of the biassed trunnion 24 and zero depth in the bearing portions at both the sides.

Then, it is arranged that at the rotation of the valve disc 23 the sectional area in the flow route takes place in almost the same proportion. herefore, the fluid torque applied to the disc 23 is reduced compared with a torque generated during the releasing motion of the valve in case the disc is vertically disposed relative to a cylindrical bore.

With the butterfly valves illustrated in FIGS. 2A, 2B, 3A and 3B, in the body casing or valve body side there are provided projections or grooves for defining fluid flow passages, or holes or additional elements which shut out the fluid flow line, thereby separating the flow of the fluid. Therefore, there is reduced the difference in velocity between a narrowed portion where a fluid flows at a high velocity and a low velocity flow portion where a fluid flows at a low velocity, and the cavitaton and thus the noise are controlled or suppressed.

However, such butterfly valves of the known structure have common problems as described below.

(i) The flow route is finely separated by a plurality of through bores which inverse-radially converge, the bores being provided in the ribs provided in the comb-shaped body in FIG. 2 or provided over the semi-circumference in FIG. 3. Therefore such butterfly valves are not usable for a fluid containing slurry or foreign particles, being feared for blocking with foreign particles.

(ii) Since, as described above, projections or additional elements are exposed to the flow, it is difficult to maintain their strength against the fluid force at high velocity or the collision by foreign particles.

(iii) The valve disc or the valve casing has a complicated shape, so that the manufacturing cost is high.

Further, the butterfly valve shown in FIG. 4 is not intended to restrain the cavitation or noise. That is, the recesses in the downstream side of the valve seat are not cylindrical being narrowed for width in the bearing portions so that the sectional area of the flow route becomes constant at the rotation of the valve disc thereby to aim at the reduction of torque.

OBJECTS OF THE INVENTION

It is, therefore, an object of the present invention to overcome the various problems in said conventional techniques and to provide a butterfly valve with low noise and with simple construction, which is capable of controlling any cavitation occurring in the narrowed flow region of the valve whereby a noise is reduced.

Another object of the present invention is to provide a butterfly valve simply arranged so that a forced partial stress is not applied to a high flow velocity energy or the collision by foreign particles so as to be used for fluids intended to be transported at a high flow rate and for fluids even containing slurry or foreign particles.

DISCLOSURE OF INVENTION

To achieve the above objects according to the present invention there is provided a butterfly valve with low noise comprising:
  a valve casing;
  a valve disc which is rotatably supported by a valve rod in the valve casing and which opens and closes a fluid flow line in cooperation with a valve seat provided in an inner peripheral wall of the valve casing; and
  an enlarged section which is provided on the valve casing in a downstream side immediately behind the valve seat provided on the inner peripheral wall of the valve casing and has an enlarged sectional shape symmetrical with respect to a centre axis for controlling a noise and cavitation to be generated on the valve disc.

With the butterfly valve according to the present invention, the provision of the enlarged section makes it possible to lower a flow rate of a fluid flowing in the narrowed flow region which is defined in the downstream side immediately behind the valve seat at the valve opening so as to prevent a pressure of the fluid from being reduced. Further, the enlarged section is axially extended to increase the area of high pressure in the downstream of the valve disc. It is, therefore, possible to reduce a chance of growing an air bubble nuclei based on the shearing force by the flow rate difference, and to shorten the time of growing air bubble, followed by control of growth of the air bubbles.

In order to control the occurrence of the noise and cavitation, as a result of practical measurement it has been found that a beginning portion of the enlarged section may be positioned at a distance which is smaller than ½ of an inner diameter of a piping to which the butterfly valve is mounted from a position immediately behind the valve body in a fluid flow direction. The beginning portion of the enlarged section may be most preferably determined at the position immediately behind the valve body. It is also found that an inner diameter of the enlarged section may be more than 1.3 times the inner diameter of the piping while the axial length of the enlarged section may be more than 0.5 times the inner diameter of the piping.

Moreover, in order to control or suppress the noise and cavitation to be generated in the valve disc the outer diameter of the valve disc and the inner diameter of the valve seat of the valve casing may be made lower than 0.77 times the inner diameter of the piping. In this case, the inner diameter of the enlarged section may be made to be the size same as the inner diameter of the piping.

DETAILED DISCLOSURE OF THE INVENTION

The invention will now be described more in detail in respect of the embodiments of the invention with reference to FIGS. 5 to 7 of the accompanying drawings.

Theoretical Explanation of the Means for Solving the Problems

Figure 5:
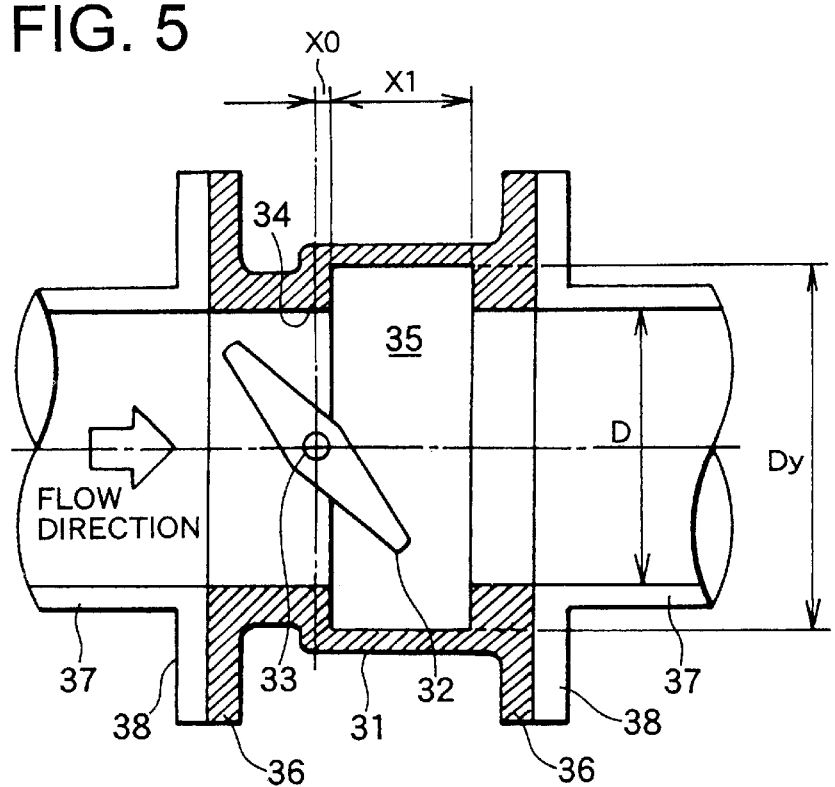
FIG. 5 is a longitudinal section view showing a butterfly valve according to one embodiment of the present invention.

FIG. 5 illustrates a testing valve for explaining the control theory of cavitation and confirming the effect of the invention.

Figure 1:
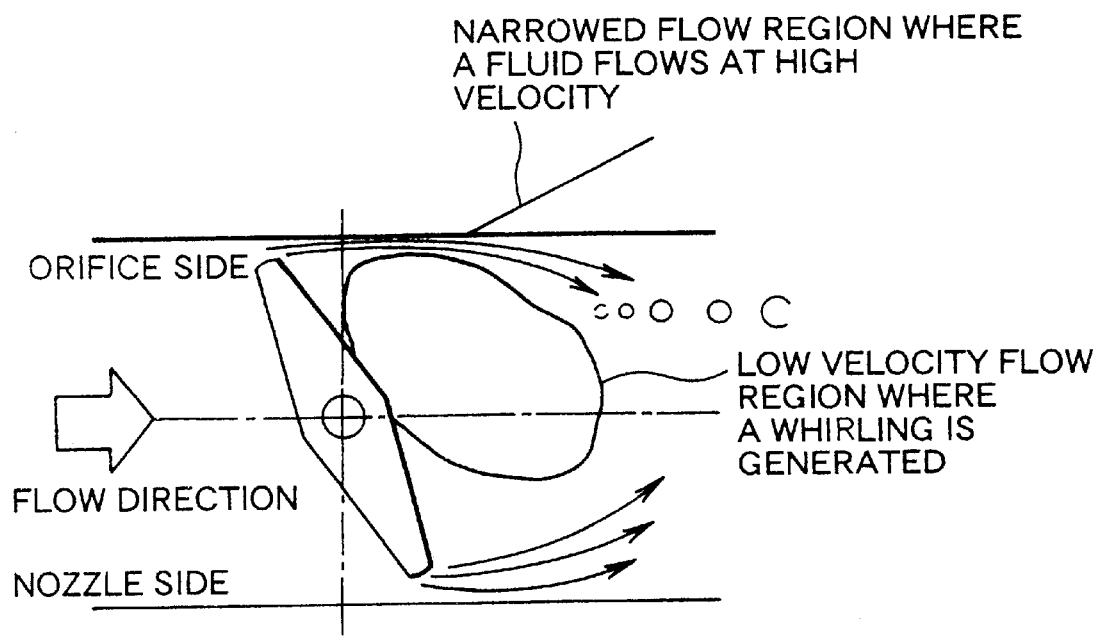
FIG. 1 is a schematic view showing how a cavitation may be generated in an ordinary butterfly valve.
Figure 2A:
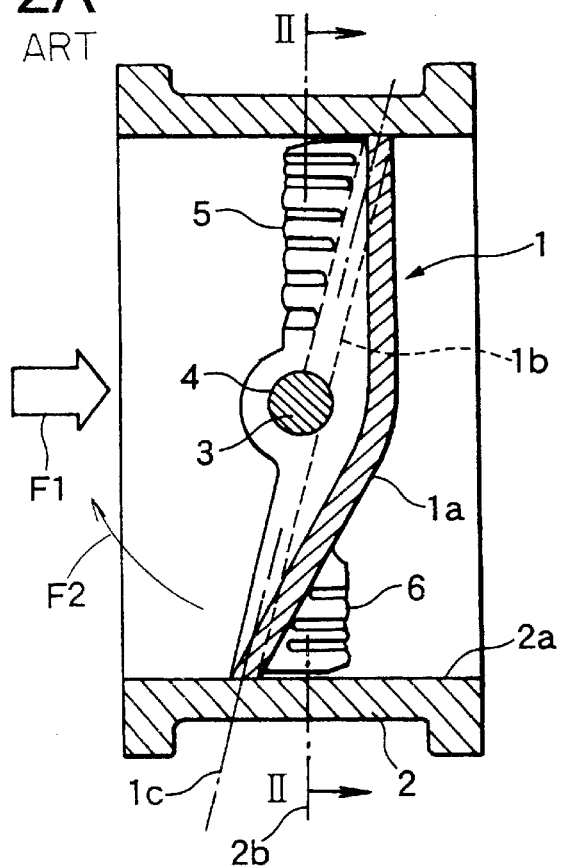
FIG. 2A is a sectional view showing a conventional butterfly valve.
Figure 2B:
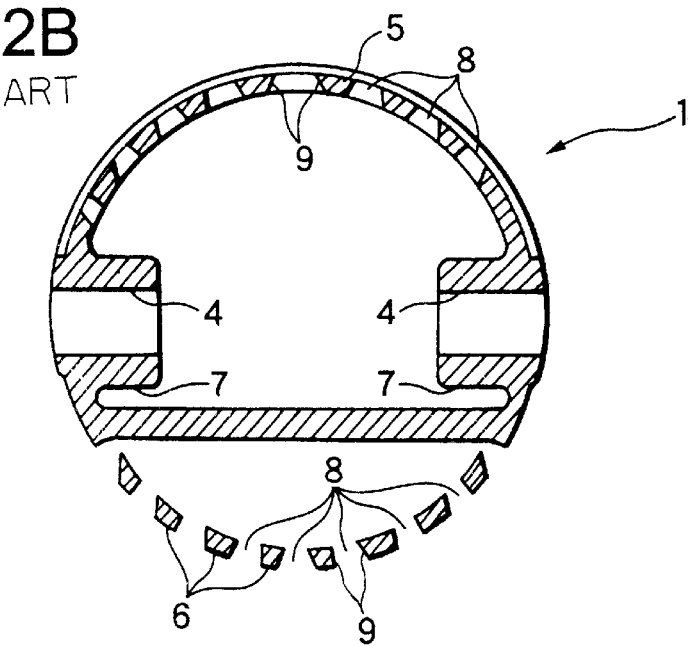
FIG. 2B is a sectional view taken along the II—II line in FIG. 2A.
Figure 3A:
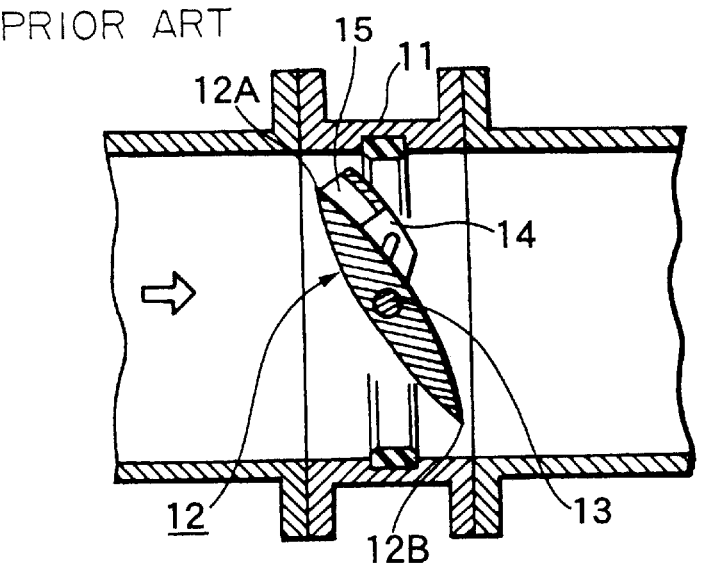
FIG. 3A is a longitudinal section showing another conventional butterfly valve.
Figure 3B:
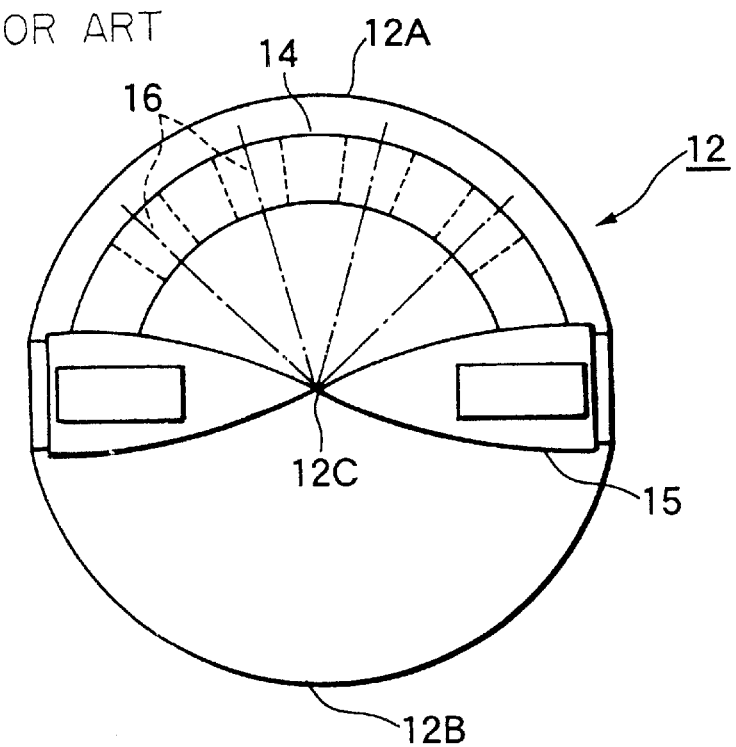
FIG. 3B is a plan view showing a valve disc in the butterfly valve of FIG. 3A.
Figure 4A:
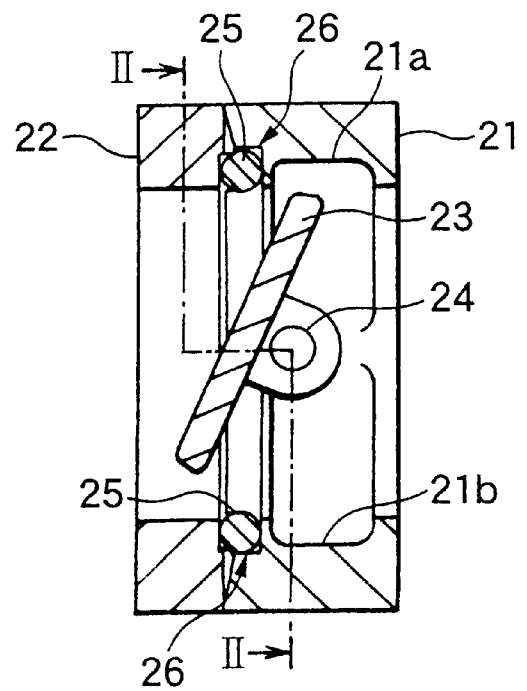
FIG. 4A is a longitudinal section showing a further conventional 30 butterfly valve.
Figure 4B:
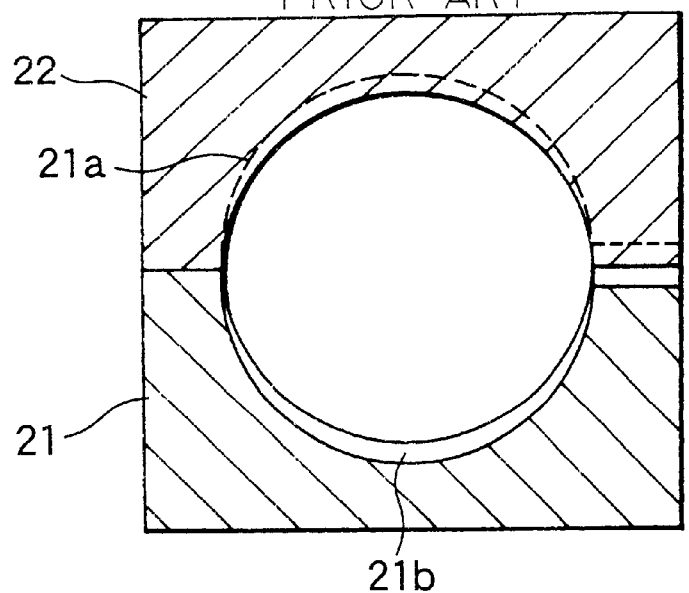
FIG. 4B is a sectional view taken along the II—II line in FIG. 4A.

As described by referring to FIG. 1, cavtation is caused in such a manner that the fluid discharged from the region between the valve disc and the valve casing increases its flow rate, to reduce the pressure, most in the narrowed flow region which is delimited between the boundary surface of zero flow rate of the pipe wall and the lower flow rate region in the downstream side of the valve disc where the swirling is produced. Further, the flow rate of the fluid in the narrowed flow region is greatly different from the flow rate of fluid in the neighborhood of the swirl or pipe wall, so that the shearing force becomes great thereby making a chance of growing the air bubble nuclei contained in the fluid to cavitation air bubbles. Since the fluid pressure in the narrowed flow region becomes very low, the air bubbles rapidly grow, this phenomenon sufficiently continues, and at the time when the air bubbles have grown larger the pressure is restored to break the air bubbles whereby vigorous cavitation occurs.

Thus, the occurrence of cavitation is caused in the zone where the pressure is quickly reduced. In order that cavitation becomes vigorous a time is required for growing the air bubbles. Accordingly, as essential conditions to control or suppress the cavitation it should be taken into consideration not to produce a low pressure zone and not to give a time of growing the air bubbles.

According to the present invention, therefore, as shown in FIG. 5, the inner diameter of the valve casing is enlarged near the narrowed flow region of the fluid. As a result, the contraction flow is relieved in the enlarged region. Therefore, it is possible that the flow rate of the fluid in the narrowed flow region is reduced to permit the pressure to be less lowered. In addition, the distance between the low velocity flow region where a swirling is produced and the high velocity region is widened, and therefore while reducing the velocity difference, the chance of initiating the growth of air bubbles can be reduced.

Further, since the pressure is quickly recovered in enlarged section of the valve casing an opportunity capable of growing the air bubbles is decreased even if the air bubbles are generated. As a result it is capable of restraining the growth of cavitaton air bubbles.

Specification of the Enlarged Section Dimension which Brings about a Noise Reduction Effect With regard to the dimension of the enlarged section of the valve casing immediately behind the valve disc, a dimension ratio required for noise reduction effect was obtained as a result of a practical measurement.

A testing was carried out in a pipe passage having a square section, which a square valve disc is disposed, and at valve opening θ=45° (at which opening the noise becomes maximum in the apparatus)

In addition, one side of the square section D is 50 mm.

Moreover, as a parameter expressing the vigor of cavitation the cavitation coefficient σ is defined by the following equation:

$$\sigma=(P1-Pv)/(1/2\rho V^2)$$

wherein P1 represents a hydrostatic pressure at the upstream side, Pv a saturated vapour pressure, ρ a fluid density, and V an average flow rate. The cavitation coefficient means that the smaller in value the more cavitation occurs. That is, if the noise value is low when the cavitation coefficient is either equal or smaller in value, then an effect of controlling the cavitation and noise is to be recognized.

In the testing valve of FIG. 5, the level of cavitation noise was measured by changing the dimensions X0, X1 and Y. The result of the measurement is shown in FIGS. 8 to 10.

(a) Affection of Position X0 of the Enlarged Section

In this testing, the depth of the enlarged section Y was set at 10 mm, and a comparison was performed in relation to the five kinds of dimensions: X0=0, D/2, D, 1.5D and non-provision of enlarged section or Normal (configuration in FIG. 1).

Figure 8A:
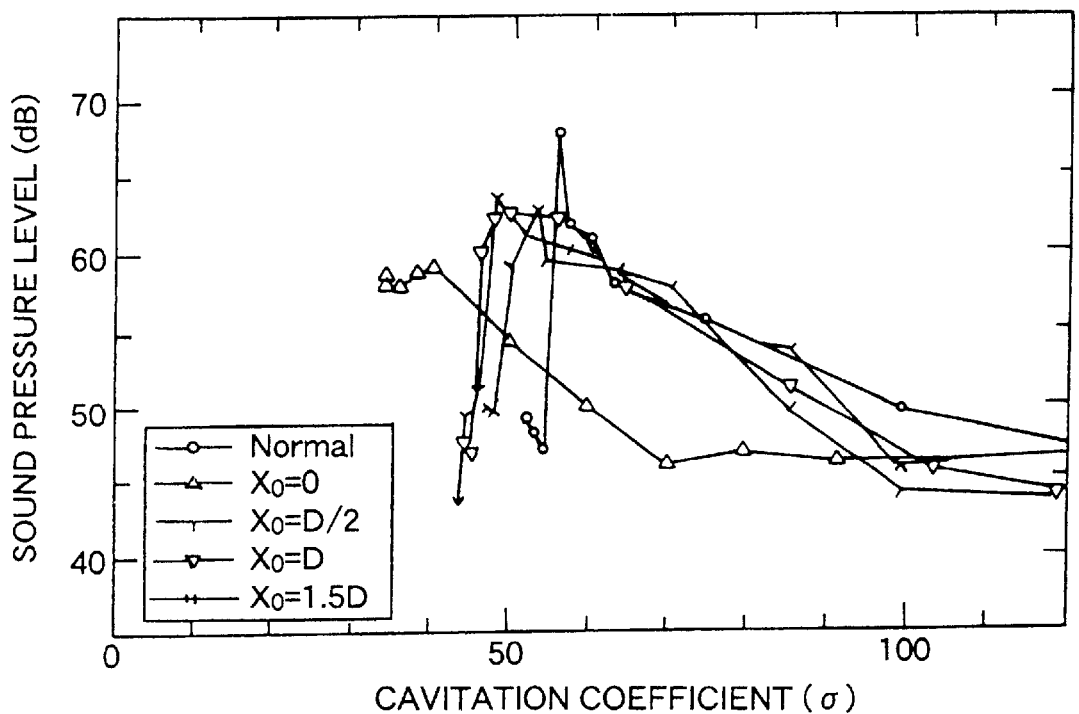
FIG. 8A is a graph showing the measured results of noise variations when the position X0 of the enlarged section is varied, in which sound pressure levels for every cavitation coefficient at frequency 2.5 KHz are illustrated.
Figure 9A:
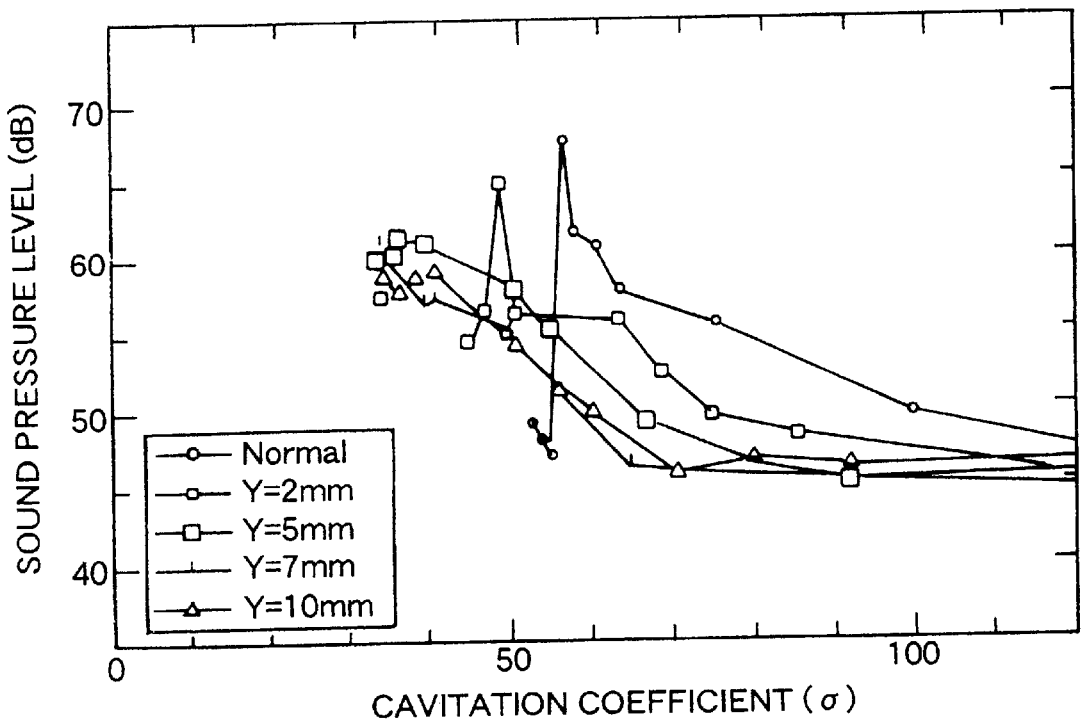
FIG. 9A is a graph showing the measured results of noise variations when a radial depth Y of the enlarged section is varied, in which sound pressure levels for every cavitation coefficient at frequency 2.5 KHz are shown.

FIG. 8A shows a result of the sound pressure variations of cavitation noise at representative frequency 2.5 KHz.

In the sound pressure levels of FIG. 8A, the noise (Δ) when X0=0 is reduced in all the sound pressure levels in the range of cavitation coefficients 55–180 when compared with that of Normal (●). The more X0 is increased the smaller the effect is reduced, and in X0=D/2 (▼) there exists no longer the difference with Normal (●). Thus, it is necessary that X0 is smaller than D/2.

Additionally, the state where the cavitation coefficient of Normal is lower than 55 is in the flushing state.

Figure 8B:
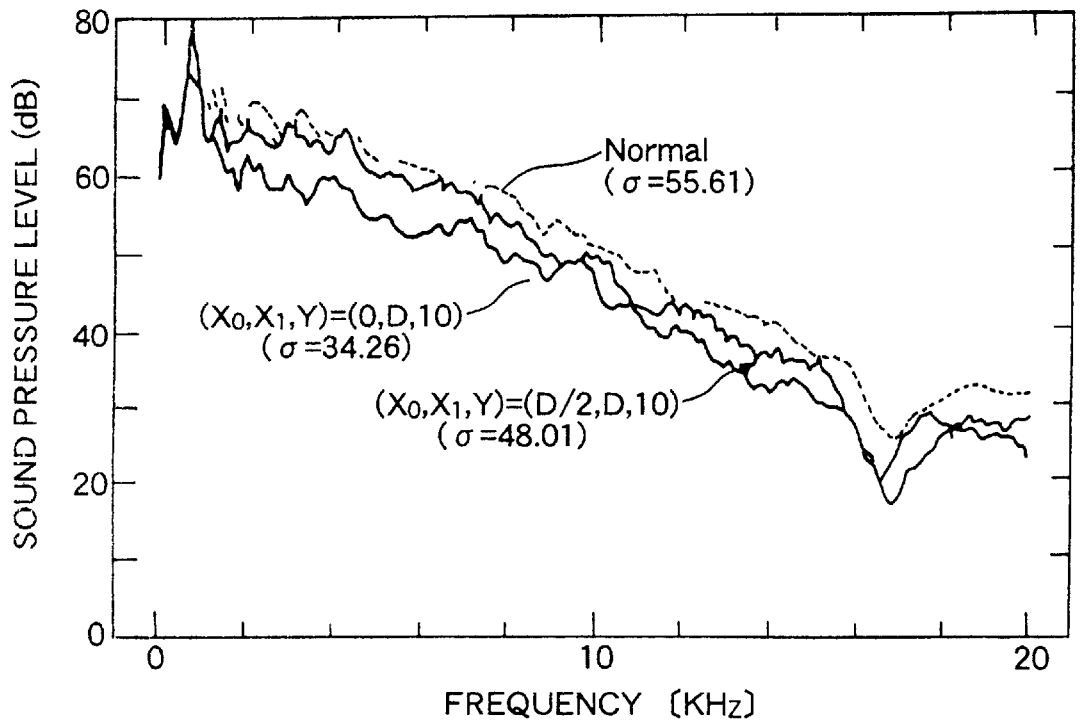
FIG. 8B is a graph showing sound pressure levels for every frequency at the cavitation coefficient when the sound pressure becomes maximum.

FIG. 8B shows a result of the sound pressure of the audio frequency. In the case of X0=0 (0, D, 10), the sound pressure levels in the range from 1 KHz to 15 KHz are lowered more than that of Normal and it will be seen that a decrease of the narrowed flow region is needed for controlling noise.

(b) Affection of Depth Y of the Enlarged Section

The position X0 of the enlarged section was fixed at 0 mm from the results of FIG. 8, and the affection of depth Y on cavitation noise was investigated. The length of the enlarged section was fixed at X1=D, and the measurement of cavitation noise was performed with regard to the five kinds of the depth: 2 mm, 5 mm, 7 mm, 10 mm and Normal (=0 mm). It is apparent from FIG. 9A that the effect becomes significant as the depth increases from Y=2 mm (■) to Y=7 mm (▲), and that the noise value is reduced more than that of Normal (●) in case the cavitation coefficient is more than 55.

However, even if increased more than Y=7 mm (▲) the effect is not improved, and in case Y=10 mm (▲) the sound pressure becomes approximate)y the same as in the case of 7 mm.

It can therefore be appreciated that the inner diameter of the enlarged section should be more than 1.3 times of D, but that increasing more will be of the same result.

Figure 9B:
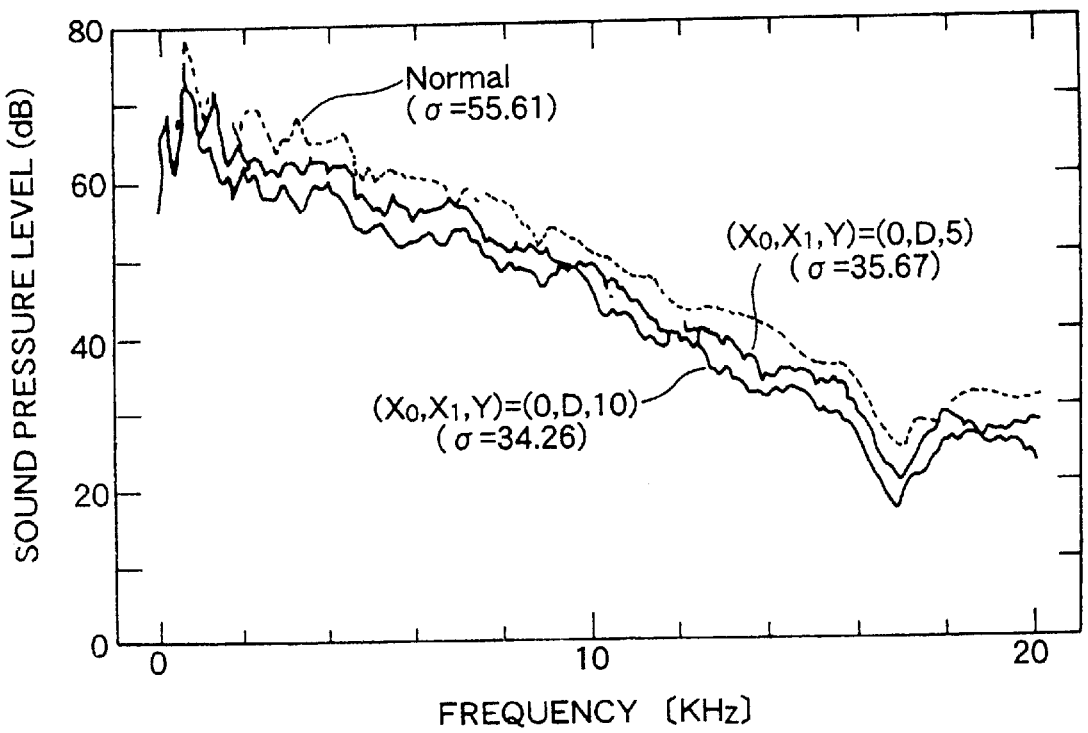
FIG. 9B is a graph showing pressure levels for every frequency at the cavitation coefficient when the sound pressure becomes maximum.

Even in FIG. 9B when the depth Y is 10 mm (0, D, 10) the every noise value between 0.5 KHz and to 18 KHz is lower than that of Normal.

(c) Affection of Length X1 in the Enlarged Section

On the basis of the results of FIGS. 8 and 9, the position X0 and the depth Y were fixed at 0 mm, 10 mm, respectively. The affection of the length X1 was investigated with regard to the six kinds of D/3, D/2, D, 1.5D, 2D and Normal (absence of groove).

Figure 10A:
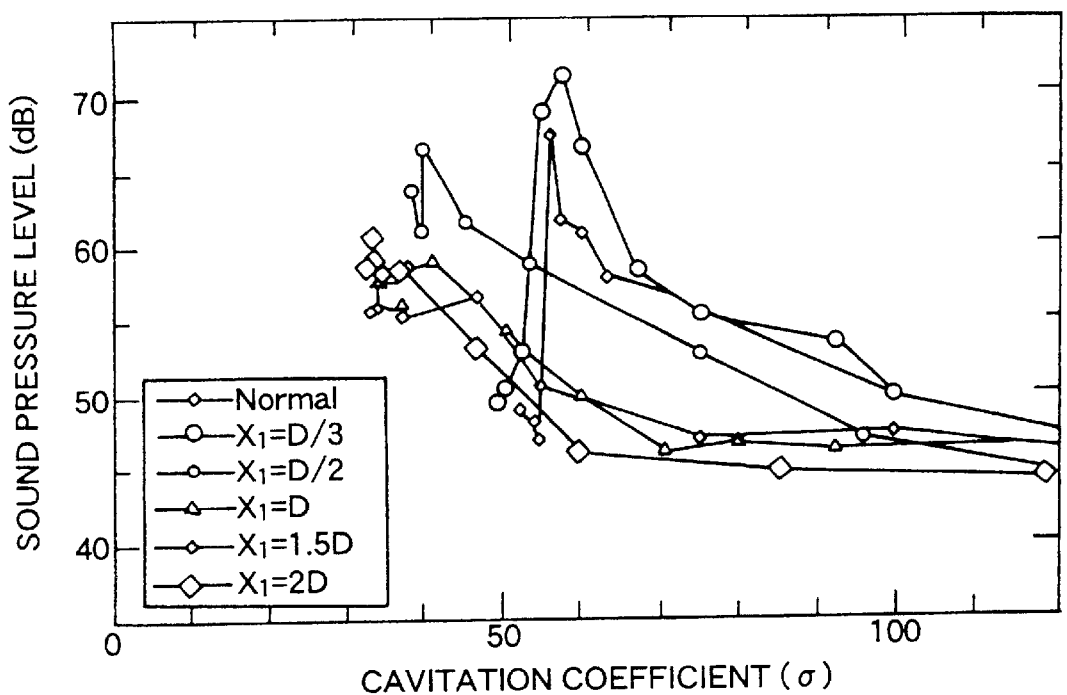
FIG. 10A is a graph showing the measured results of noise variations when the length X1 of the enlarged section is varied, in which sound pressure levels for every cavitation coefficient at frequency 2.5 KHz are shown.
Figure 10B:
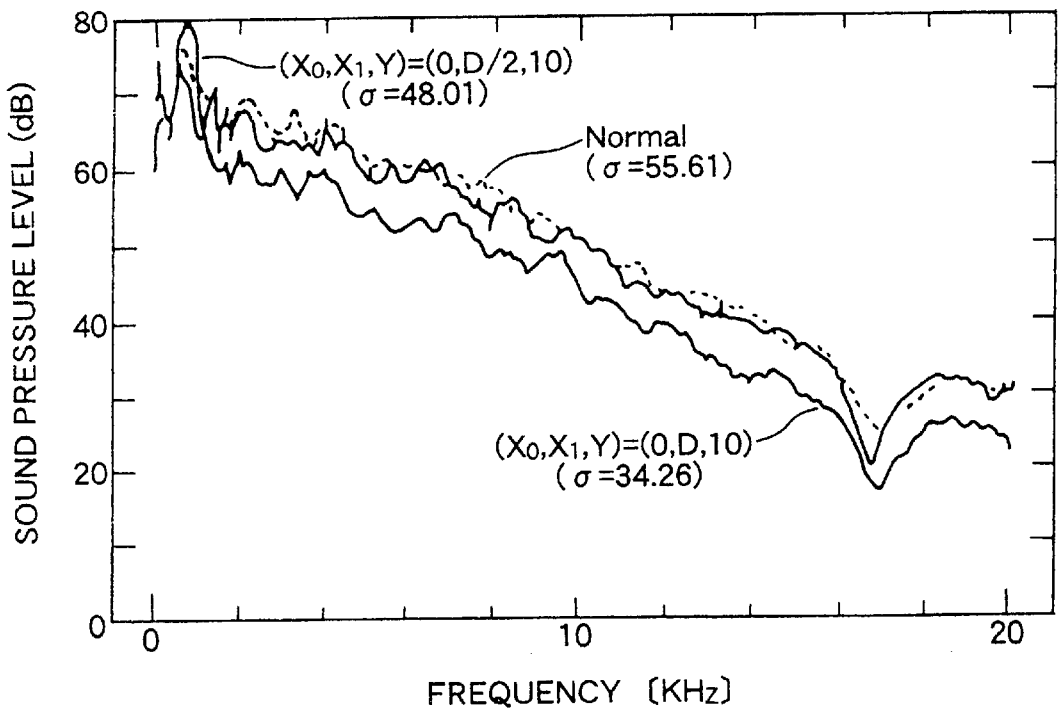
FIG. 10B is a graph showing sound pressure levels for every frequency at the cavitation coefficient when the sound pressure becomes maximum.

It is clear from FIG. 10A that when X1=D/2 (○) the noise value is lowered more than in Normal (●) in case the cavitation coefficient is more than 55 whereby the effect is improved. Up to X1=D (△), the larger in X1 the more the effect is improved, but even if the position X1 is increased more than D it appears that the improved effect is not obtained.

As for Normal (●) it was confirmed by visualization experiments that a cloud of cavitation bubbles occurred behind the valve disc and that its length became about D. Consequently, it is seen that an enlarged section of the length requires about 1D.

Additionally, in FIG. 10A the sound pressure of X1=D/3 (○) is greater than that of Normal. This is because the cavitation vigorously occurs from the stepped portion (E portion in FIG. 7) at the terminating end of the enlarged section. That is, it will be seen that if an error is made to the dimension ratio of the enlarged section will make a reverse effect.

(d) Flushing

In FIGS. 8A, 9A and 10A, the sound pressure level of Normal declines abruptly when the cavitation coefficient becomes smaller than 55 and this state is called flushing. Moreover, the sound pressure level of the present invention is smaller than that of Normal. In this respect the following explanation regarding the flushing will be added.

As the flow rate increases and the cavitation coefficient σ becomes smaller, the cavitation occurs more vigorously, but if σ becomes smaller than a certain value, the cavitation bubbles flow away without being collapsed. This state is called flushing, and in the flushing state the noise becomes smaller. However, the state is such that almost all parts in the fluid flow are filled with cavitation bubbles, and this state continues downstream because the pressure behind the valve becomes almost saturated vapor pressure. In this state, the flow and pressure cannot be controlled by the valve and the valve can not operate as a control valve even if the noise is small, and therefore such state should be avoided as much as possible.

For example, in FIG. 10A, as the cavitation coefficient becomes smaller the sound pressure increases, and in the mean-time the sound pressure is rapidly reduced. Thus this state is the flushing.

In FIG. 10A, Normal flushing zone: σ=lower than 55, and X1=flushing zone of D: σ=lower than 40.

As described above, in the testing the model of the present invention provided with an enlarged section is smaller in the cavitation coefficient reaching the flushing, compared with Normal, and this shows that the control is possible up to a greater flow rate.

EMBODIMENT

FIG. 5 illustrates an embodiment of the invention. The valve illustrated in FIG. 5 comprises a valve casing 31 and a valve disc 32. The valve disc 32 is rotatably supported by a valve rod 33 in the valve casing 31, and opens and closes the flow route of a fluid in cooperation with a valve seat 34 provided in an inner peripheral wall of the valve casing 31.

The valve casing 31 includes an enlarged section 35 that is provided in a downstream side immediately behind the valve seat where the valve disc 32 is abutted at the entire closing of the valve disc 32. The enlarged section 35 has a cylindrical shape in section and is symmetrical relative to a centre axis. The enlarged section 35 is intended for controlling the noise and cavitation to be generated on the valve disc 32.

The valve casing 31 also includes flanges 36 that are connected to flanges 38 of pipings 37. In the drawing, D designates an inner diameter of the respective piping 37 and is equal to the inner diameter of the connection portions or flanges at both the ends of said valve casing 31. X0 denotes the distance between the centre axis of the valve rod 33 i.e. the centre of the valve seat 34 and a starting end of the enlarged section 35. The distance X0 is shorter than ½ of the diameter D of the piping 37 or the valve casing 31 and set as close to zero as possible.

Further, the enlarged section 35 has an inner diameter Dy which is set to 1.3 times the inner diameter D and a length X which is set to more than 0.5 times the inner diameter D.

Figure 6:
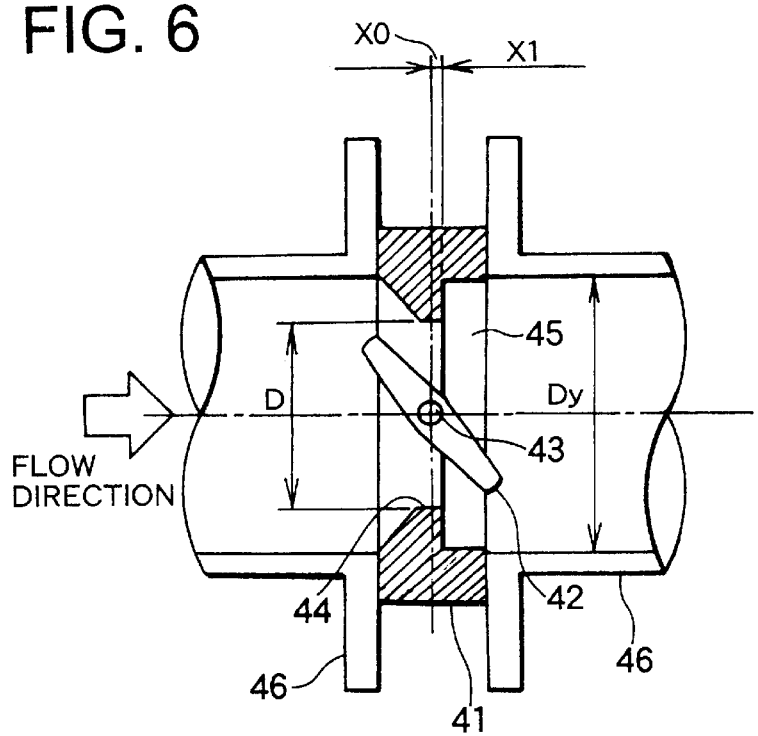
FIG. 6 is a longitudinal section view showing a butterfly valve according to another embodiment of the present invention.
Figure 7:
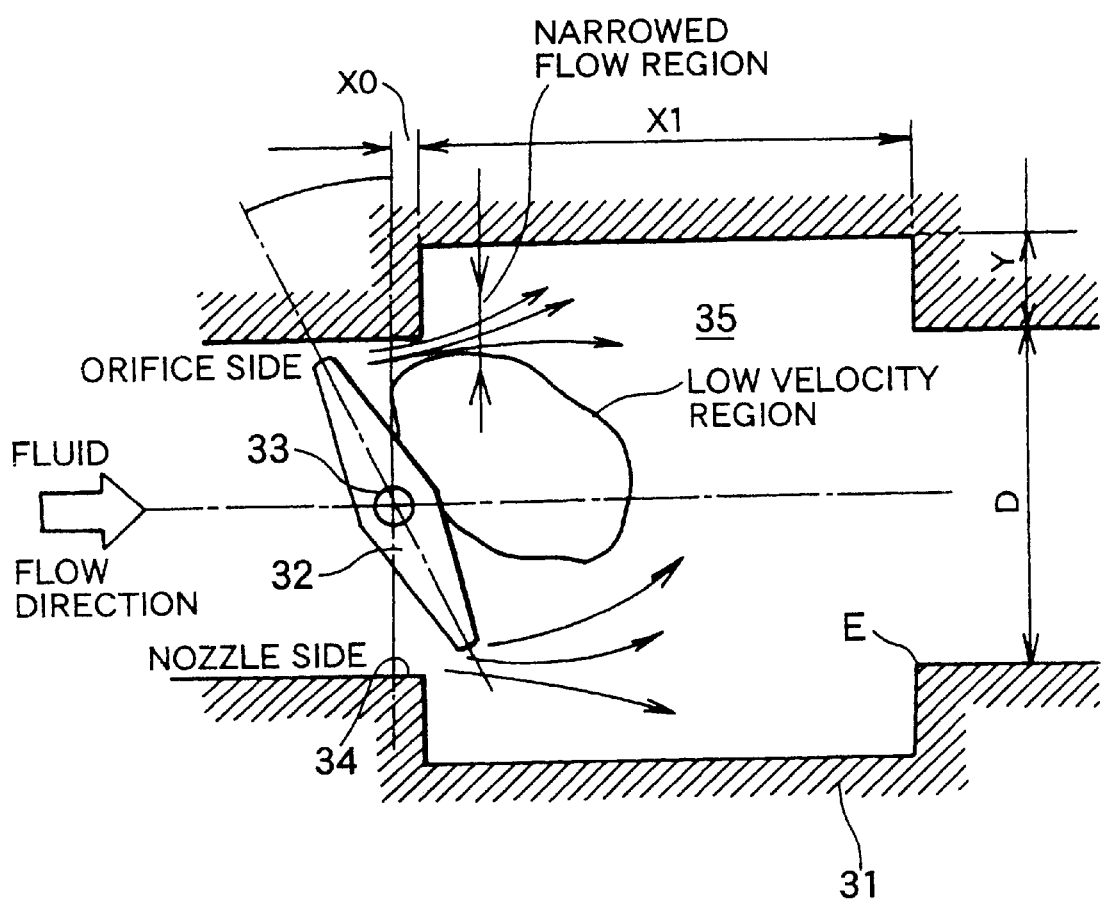
FIG. 7 is a sectional view of a testing valve prepared to confirm the results of the invention, and also a schematic view for explaining the control theory of cavitation.

FIG. 6 illustrates a butterfly valve according to another embodiment of the invention.

The valve arrangement illustrated in FIG. 6 comprises a valve casing 41 and a valve disc 42 that is rotatably supported by a valve rod 43 in the valve casing 41. The valve disc 42 is cooperated with a valve seat 44 provided in an inner peripheral wall of the valve casing 41 to open and close the flow route of a fluid.

The valve casing 41 includes an enlarged section 45 that is provided in a downstream side immediately behind the valve seat 44 where the valve disc 42 is abutted at the entire closing of the valve disc 42. The enlarged section 45 has a cylindrical shape in section and is symmetrical relative to a centre axis.

The valve casing 41 has an inner diameter D which is substantially equal to an outer diameter of the valve disc 42 and is set to be less than 1/1.3=0.77 times the inner diameter Dy of the piping 46. The enlarged section 45 is enlarged to have the same diameter as the inner diameter Dy of the piping 46. The enlarged section 45 has an axial length X1 that is constructed to the infinity (∞) including the piping 46. The valve is mounted between the flanges 47 of the pipes 46.

The function of the butterfly valve according to the embodiment shown in FIG. 5 will now be described with reference to FIG. 7.

The section of the valve casing 31 in the downstream side immediately behind the valve seat 34 is radially enlarged to define the enlarged section 35 that is symmetricaly cylindrical relative to the centre axis. By such configuration the pressure the fluid in the narrowed flow region defined at the downstream side of the peripheral edge of the valve disc 32 particularly on a orifice side can be reduced, and thus the generation of air bubbles can be controlled.

Further, it is possible to reduce the velocity difference in the flow rate of fluid between the low flow rate region where swirling is created at the downstream side of the valve body 32 and the narrowed flow region. Consequently, it is possible to reduce a chance of growing the air bubbles, which is caused based upon a shearing force of the fluid flow. Furthermore, even if cavitation bubbles occur, the pressure is quickly restored in the enlarged section 35 of the valve casing 31, so that the time of growing cavitation bubbles is shortened and the growth thereof can be controlled. It should be understood that such function is obtained approximately in the same way in the embodiment of FIG. 6.

Figure 11:
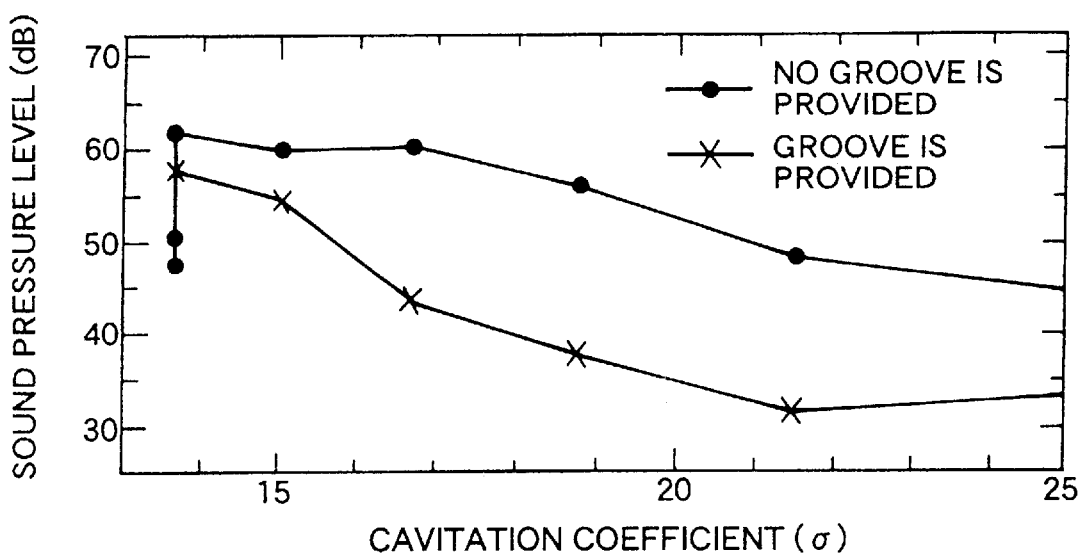
FIG. 11 is a graph showing the results that has been measured at opening θ=45° and frequency 2 KHz for identifying a noise reduction effect of controlling the noise caused by cavitation in the embodiment of FIG. 5.
Figure 12:
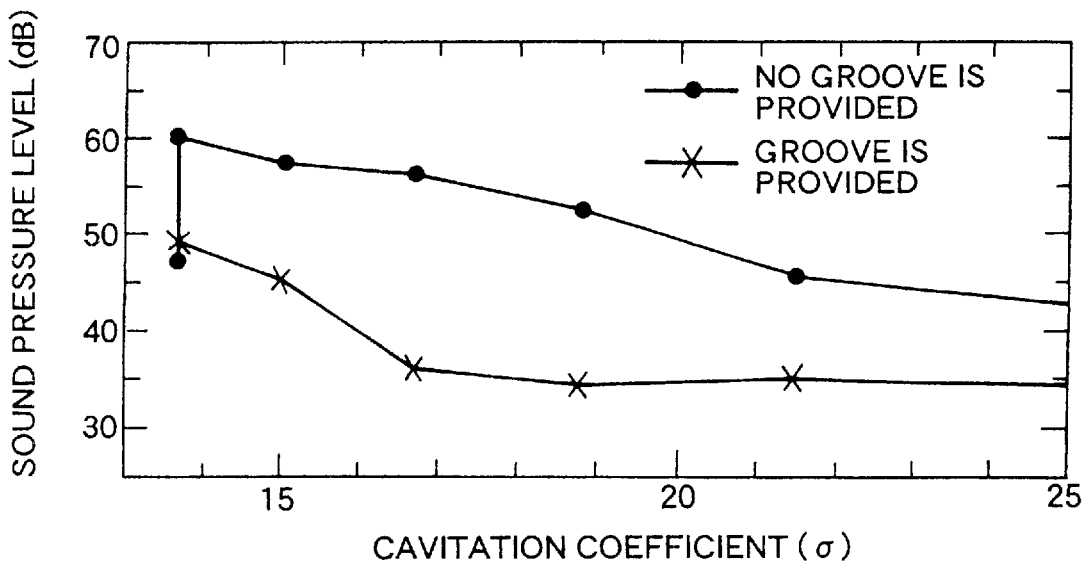
FIG. 12 is a graph showing the results that has been measured for confirmation at opening θ=45° and frequency 2.5 KHz for identifying the effect of controlling the noise caused by cavitation in the embodiment of FIG.

FIGS. 11 and 12 show the measured result of the noise of practical cavitation in the embodiment shown in FIG. 5. The axis of ordinate represents the cavtation coefficient a and the axis of abscissas represents the sound pressure level in each figure. FIG. 11 shows the sound pressure level at the representative frequency of 2 KHz and FIG. 12 shows that of 2.5 KHz.

The butterfly valve used for the above measurements is the one as described hereunder.

A butterfly valve with the inner diameter of 50 mm is provided at downstream side of the valve disc in the flowing direction of the fluid with an enlarged section having the dimension of X0: 0 mm X1=50 mm (1 time the inner diameter of the valve) and Y: 10 mm (inner diameter of the enlarged section=70 mm, that is, 1.4 times of 50 mm).

It has a shape closely similar to the embodiment of FIG. 5. In FIGS. 11 and 12 presence of groove or the enlarged section is shown with (×).

On the other hand, absence of groove or the enlarged section (●) shows the measured result of a butterfly valve without the enlarged section in the same valve body, and it shows the case of a conventional butterfly valve.

In these butterfly valves the same valve opening was set to θ=45° and the noise values at the variation of the flow rate were measured in respect of the representative frequencies 2 KHz and 2.5 KHz.

As a result, even if the flow rate increases, the sound pressure level (noise value) of cavitation is low in the result of the groove presence (×) rather than that of the groove absence (●), which means that an effect may be obtained.

As described above in detail, according to the present invention, the valve casing in the downstream side immediately behind the valve seat there is provided an enlarged section whose sectional shape is symmetrical with respect to the centre axis so as to restrain the noise and cavtation produced in the valve body. Therefore, the following effects can be obtained.

(i) The pressure in the narrowed flow region is less lowered to prevent the occurrence of cavitation bubbles.

(ii) It is possible that the velocity difference between the narrowed flow region and the region where swirling is generated is reduced, and also the chance of growing air bubbles is reduced.

(iii) Further, even if air bubbles occur, the time of growing the air bubbles is shortened because the pressure is quickly restored in the enlarged section having an inner diameter larger than that of the other portions of the valve casing. Therefore, the growth of cavitation air bubbles can be reduced.

Additionally, the inner diameter of the enlarged section of the valve casing in the downstream side immediately behind the valve seat is set to more than 1.3 times the inner diameter of the piping. Also, the length thereof is set to more than 0.5 times the inner diameter of the piping. Therefore, as will be seen from the results of FIGS. 8 to 10, in the condition of the same cavitation coefficient a, that is, under the same vigorous cavitation, the noise of the valves having a dimension of X0=0, X1=D and Y=10 are reduced by about 10 dB in the range σ=55 to 90 as is seen from FIG. 10A when compared with a conventional valve having no enlarged section in a downstream side of a valve casing (FIG. 1).

Moreover, since the pressure in the upstream side is constant in the arrangement of the present invention, even the flow rate is the same if σ is the same, so that it can be appreciated that the noise reduction effects can be produced even compared at the same flow rate.

Further, as shown in FIGS. 11 and 12, even in the results of the measurements carried out for estimating noise reduction effects in a practical butterfly valve (FIG. 5), it is confirmed that the cavitation noise can be reduced significantly by the present invention compared with the conventional butterfly valve (FIG. 1) with no enlarged section in the valve casing.

Furthermore, with the arrangement that the outer diameter of the valve body and the inner diameter of the valve seat on the valve casing are set to not more than 0.77 times (to be inverse number) the inner diameter of the piping, and the portion of the valve casing behind the valve seat in a fluid flow direction is determined to have an inner diameter of the same dimension as the inner diameter of the piping, it is also capable of obtaining the noise reduction effects al-most same as the above.

What is claimed is:

1. A butterfly valve with low noise comprising:

a valve casing;

a valve disc which is rotatably supported by a valve rod in the valve casing and which opens and closes a fluid flow line in cooperation with a valve seat provided in an inner peripheral wall of the valve casing; and an enlarged section which is provided in the valve casing in a downstream side immediately behind the valve seat provided on the inner peripheral wall of the valve casing and has an enlarged sectional shape being symmetrical with respective to a centre axis for controlling an occurrence of a noise and cavitation on said valve disc wherein the enlarged section has an inner diameter that is more than 1.3 times the inner diameter of a piping and an axial length that is more than 0.5 times the inner diameter of the piping.

2. A butterfly valve claimed in claim 1, wherein a beginning portion of the enlarged section is arranged at a distance which is smaller than ½ of an inner diameter of the piping to which the butterfly valve is mounted from a position immediately behind the valve body in a fluid flow direction.

3. A butterfly valve claimed in claim 1, wherein the beginning portion of the enlarged section is arranged at the position immediately behind the valve body.

4. A butterfly valve claimed in claim 1, wherein the valve body and the valve seat on the valve casing have an outer diameter and an inner diameter, respectively, that are less than 0.77 times the inner diameter of the piping, and a portion of the valve casing behind the valve seat in a fluid flow direction has an inner diameter of the same dimension as the inner diameter of the piping.

* * * * *